US012684315B2

(12) United States Patent
Ohtake et al.

(10) Patent No.: US 12,684,315 B2
(45) Date of Patent: Jul. 14, 2026

(54) COMMUNICATION SYSTEM, COMMUNICATION TERMINAL, COMMUNICATION METHOD, AND NON-TRANSITORY COMPUTER-READABLE MEDIUM

(71) Applicant: NEC Corporation, Tokyo (JP)

(72) Inventors: Motoharu Ohtake, Tokyo (JP); Kosei Kobayashi, Tokyo (JP); Hiroaki Aminaka, Tokyo (JP); Shinji Miyazaki, Tokyo (JP); Tomoaki Nakanishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 328 days.

(21) Appl. No.: 18/276,206

(22) PCT Filed: Mar. 31, 2021

(86) PCT No.: PCT/JP2021/013853
§ 371 (c)(1),
(2) Date: Aug. 8, 2023

(87) PCT Pub. No.: WO2022/208730
PCT Pub. Date: Oct. 6, 2022

(65) Prior Publication Data
US 2024/0305958 A1 Sep. 12, 2024

(51) Int. Cl.
*H04W 4/08* (2009.01)
(52) U.S. Cl.
CPC ..................................... *H04W 4/08* (2013.01)
(58) Field of Classification Search
CPC ................................ H04W 4/08; H04W 4/06
See application file for complete search history.

(56) References Cited

U.S. PATENT DOCUMENTS

2005/0143135 A1* 6/2005 Brems ................. H04M 1/2745
455/566
2009/0298444 A1* 12/2009 Shigeta ................... H04W 4/08
455/90.2
(Continued)

FOREIGN PATENT DOCUMENTS

JP H05-168017 A 7/1993
JP 2005-269165 A 9/2005
(Continued)

OTHER PUBLICATIONS

JP Office Action for JP Application No. 2023-510023, mailed on Dec. 10, 2024 with English Translation.
(Continued)

*Primary Examiner* — Fayyaz Alam
(74) *Attorney, Agent, or Firm* — Sughrue Mion, PLLC

(57) ABSTRACT

To provide a communication system capable of easily selecting group communication to participate in halfway. A communication system according to the present disclosure includes a communication terminal and a server that controls group communication among a plurality of communication terminals. The communication terminal includes: an acquisition unit that acquires information regarding group communication that has already been started among the plurality of communication terminals and is in a non-answered state due to no answer at the start; a selection unit that selects any one from one or more group communications that are candidates for participation based on the acquired information; and a transmission unit that transmits a participation request for the selected group communication to the server. The server includes a participation acceptance unit that accepts participation of the communication terminal in the selected group communication.

9 Claims, 8 Drawing Sheets

(56) References Cited

U.S. PATENT DOCUMENTS

| 2010/0016007 | A1 | 1/2010 | Satake | |
| 2017/0201868 | A1* | 7/2017 | Zhang | H04M 1/27 |
| 2018/0324305 | A1* | 11/2018 | Dahlqvist | H04M 3/02 |

FOREIGN PATENT DOCUMENTS

| JP | 2007-300242 A | 11/2007 |
| JP | 2008-005169 A | 1/2008 |
| JP | 2008-005170 A | 1/2008 |
| JP | 2008-067083 A | 3/2008 |
| KR | 2009-0002274 A | 1/2009 |

OTHER PUBLICATIONS

International Search Report for PCT Application No. PCT/JP2021/013853, mailed on Jun. 8, 2021.

* cited by examiner

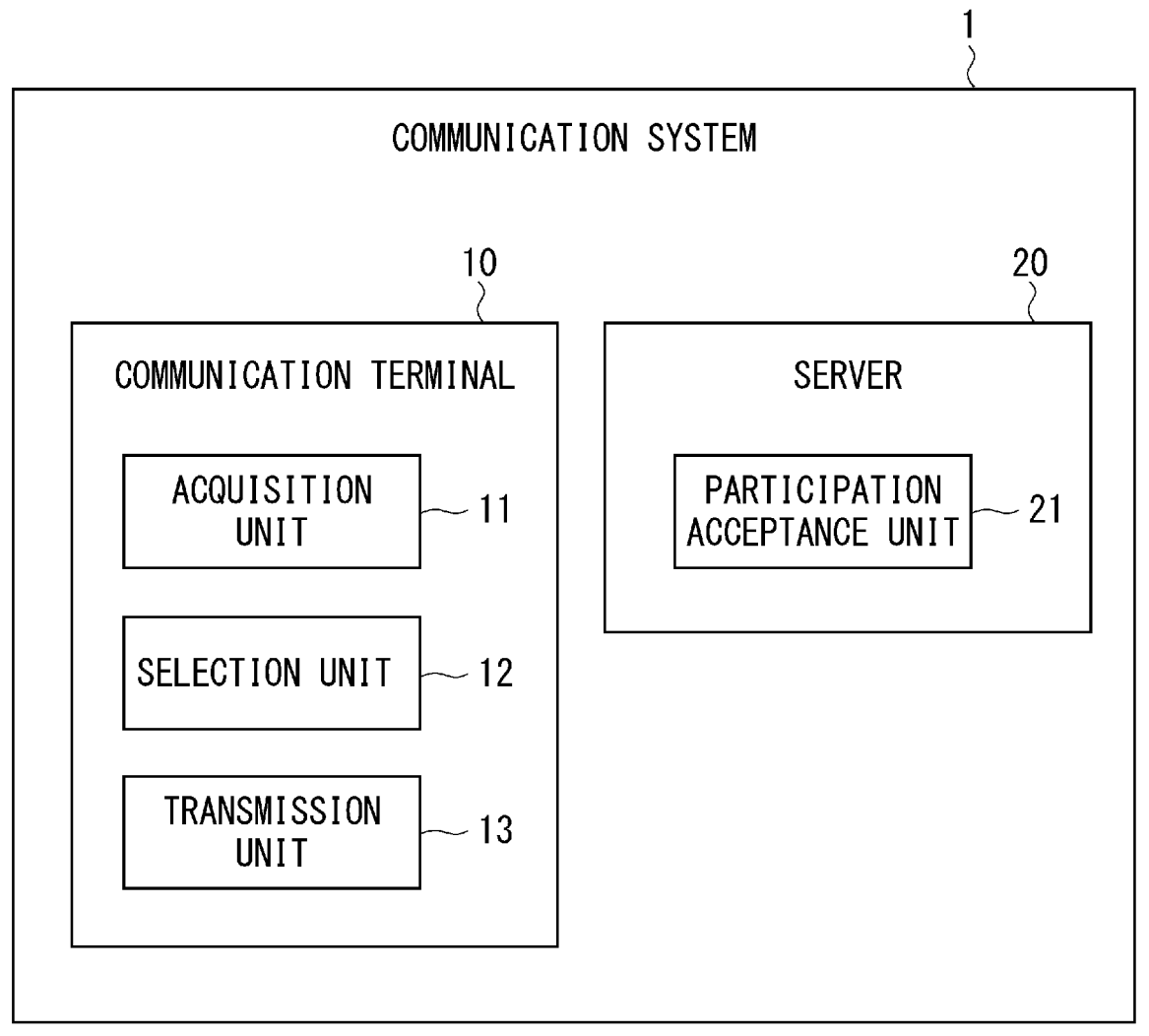
F i g.  1

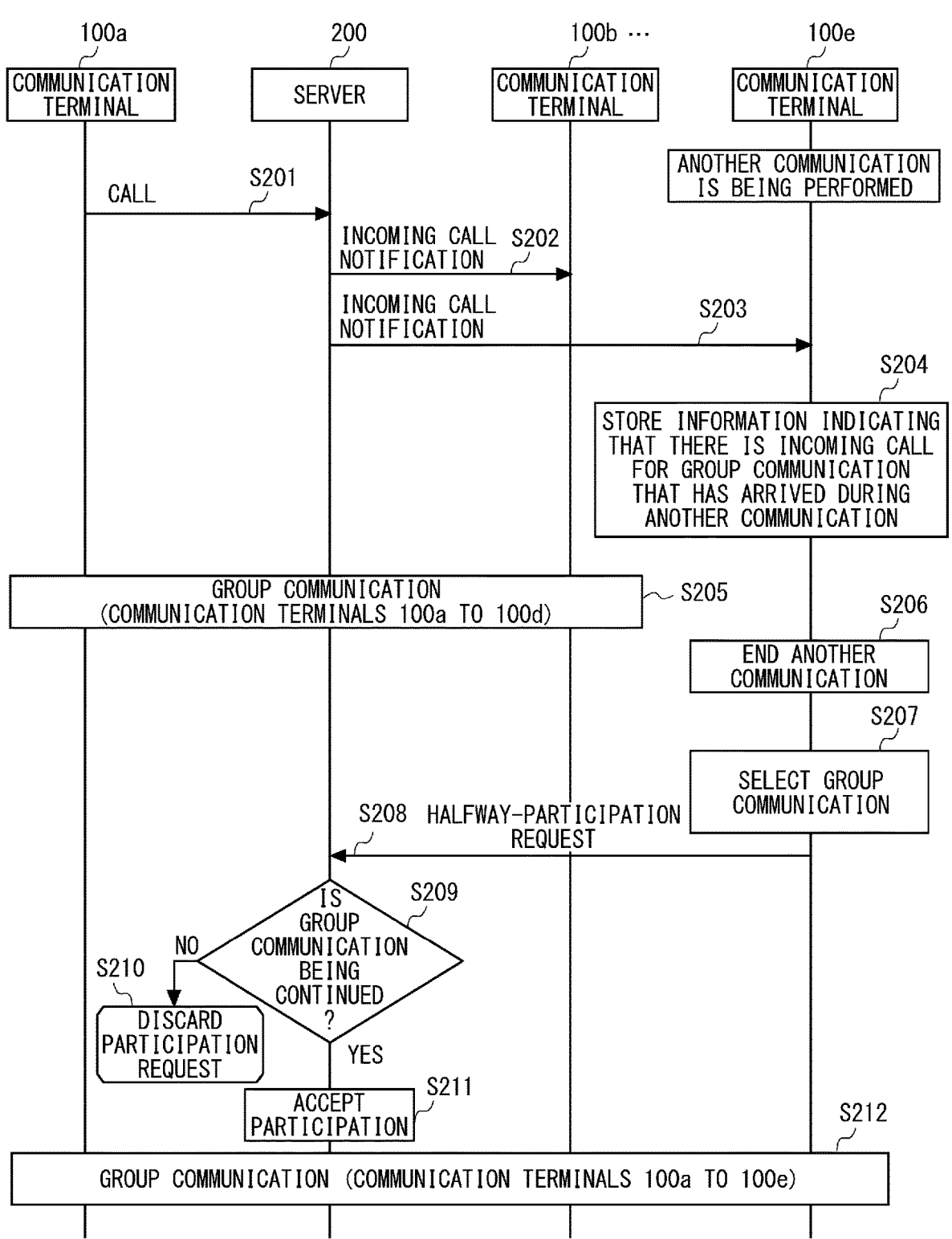
F i g. 7

COMMUNICATION SYSTEM, COMMUNICATION TERMINAL, COMMUNICATION METHOD, AND NON-TRANSITORY COMPUTER-READABLE MEDIUM

This application is a National Stage Entry of PCT/JP2021/013853 filed on Mar. 31, 2021, the contents of all of which are incorporated herein by reference, in their entirety.

TECHNICAL FIELD

The present disclosure relates to a communication system, a communication terminal, a communication method, and a non-transitory computer-readable medium.

BACKGROUND ART

There is known a technology of a group call that enables a call between users in a group by enabling transmission and reception of a voice between communication terminals of a plurality of users belonging to a specific group. The group call is started when a calling terminal transmits a start request for the group call to other terminals in the group, and the other terminals respond to the start request. However, in a case where a terminal to which the call request is transmitted is outside a communication range, the terminal cannot participate in the group call. When such a terminal returns from the outside of the communication range to the communication range, it is desirable to cause the terminal to participate in the already started group call halfway.

As a related technology, for example, Patent Literature 1 discloses a group call system in which a mobile communication terminal that has not participated in a group call can participate in the group call later. The system disclosed in Patent Literature 1 includes a plurality of mobile communication terminals and a group call control server that provides a function of a group call made between the plurality of mobile communication terminals. When a group call participation request signal is received from the group call control server, a halfway-participating terminal which does not respond to a participation request from a calling terminal and participates in the group call halfway registers an incoming call history information from the calling terminal in an incoming call history table. When the incoming call history information registered at the time of no answer is selected by a user and a start request button for the group call is pressed, the halfway-participating terminal transmits a halfway-participation request signal including a group ID to the group call control server. The group call control server executes predetermined processing, and causes the halfway-participating terminal to participate in a group corresponding to the received group ID halfway.

In addition, as another related technology, Patent Literature 2 discloses a communication system that enables a mobile station (non-answering mobile station) that did not answer a call because of being outside a range of a network to participate in a group call halfway. The communication system disclosed in Patent Literature 2 includes a base station, a group call server, and an SMS server. The group call server receives an INVITE (halfway-participation) message for causing the non-answering mobile station to participate in the group call halfway from a calling mobile station, and holds the INVITE message until the non-answering mobile station enters the range and executes registration processing. When the non-answering mobile station executes the registration processing, the group call server transmits the held INVITE (halfway-participation) message to the non-answering mobile station. The non-answering mobile station transmits 180 Ringing and 200 OK to the calling mobile station via the group call server. When ACK is transmitted from the calling mobile station to the group call server, the halfway-participation of the non-answering mobile station to the group call is completed.

CITATION LIST

Patent Literature

Patent Literature 1: Japanese Unexamined Patent Application Publication No. 2008-067083
Patent Literature 2: Japanese Unexamined Patent Application Publication No. 2008-005169

SUMMARY OF INVENTION

Technical Problem

For example, while a communication terminal is outside a communication range, participation requests from a plurality of group communications may be made. In such a case, the communication terminal receives incoming call history information regarding the plurality of group communications after moving from the outside of the communication range to the communication range. The user checks a plurality of pieces of incoming call history information displayed on the communication terminal, and considers about which group communication the user participates in halfway. The communication terminal receives selection of the group communication to participate halfway from the user, and makes a halfway-participation request to a server that controls the group communication. In particular, in a case where the number of incoming call histories is large, the user has trouble in checking the plurality of pieces of incoming call history information and selecting any one from the plurality of pieces of incoming call history information. In Patent Literature 1 and Patent Literature 2, such a problem is not considered.

In view of the above-described problems, an object of the present disclosure is to provide a communication system, a communication terminal, a communication method, and a non-transitory computer-readable medium that enable easy selection of group communication to participate in halfway.

Solution to Problem

A communication system according to the present disclosure includes: a communication terminal; and a server that controls group communication among a plurality of the communication terminals, in which the communication terminal includes acquisition means for acquiring information regarding group communication that has already been started among the plurality of communication terminals and is in a non-answered state due to no answer at the start, selection means for selecting any one from one or more group communications that are candidates for participation based on the acquired information, and transmission means for transmitting a participation request for the selected group communication to the server, and the server includes participation acceptance means for accepting participation of the communication terminal in the selected group communication.

A communication terminal according to the present disclosure includes: acquisition means for acquiring information regarding group communication that has already been started among a plurality of communication terminals and is in a non-answered state due to no answer at the start; selection means for selecting any one from one or more group communications that are candidates for participation based on the acquired information; and transmission means for transmitting a participation request for the selected group communication to a server that controls the group communication among the plurality of communication terminals.

A communication method according to the present disclosure includes: acquiring information regarding group communication that has already been started among a plurality of communication terminals and is in a non-answered state due to no answer at the start; selecting any one from one or more group communications that are candidates for participation based on the acquired information; and transmitting a participation request for the selected group communication to a server that controls the group communication among the plurality of communication terminals.

A non-transitory computer-readable medium storing a communication program according to the present disclosure causes a computer to execute: acquisition processing of acquiring information regarding group communication that has already been started among a plurality of communication terminals and is in a non-answered state due to no answer at the start; selection processing of selecting any one from one or more group communications that are candidates for participation based on the acquired information; and transmission processing of transmitting a participation request for the selected group communication to a server that controls the group communication among the plurality of communication terminals.

Advantageous Effects of Invention

According to the present disclosure, it is possible to provide a communication system, a communication terminal, a communication method, and a non-transitory computer-readable medium that enable easy selection of group communication to participate in halfway.

BRIEF DESCRIPTION OF DRAWINGS

FIG. 1 is a block diagram illustrating a configuration of a communication system according to a first example embodiment.

FIG. 7 is a sequence diagram illustrating processing in a case where the communication terminal ends another communication according to the second example embodiment.

EXAMPLE EMBODIMENT

First Example Embodiment

Figure 2:
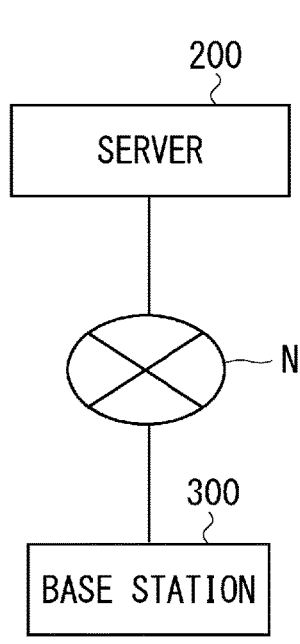
FIG. 2 is a diagram illustrating an outline of a communication system according to a second example embodiment.
Figure 2:
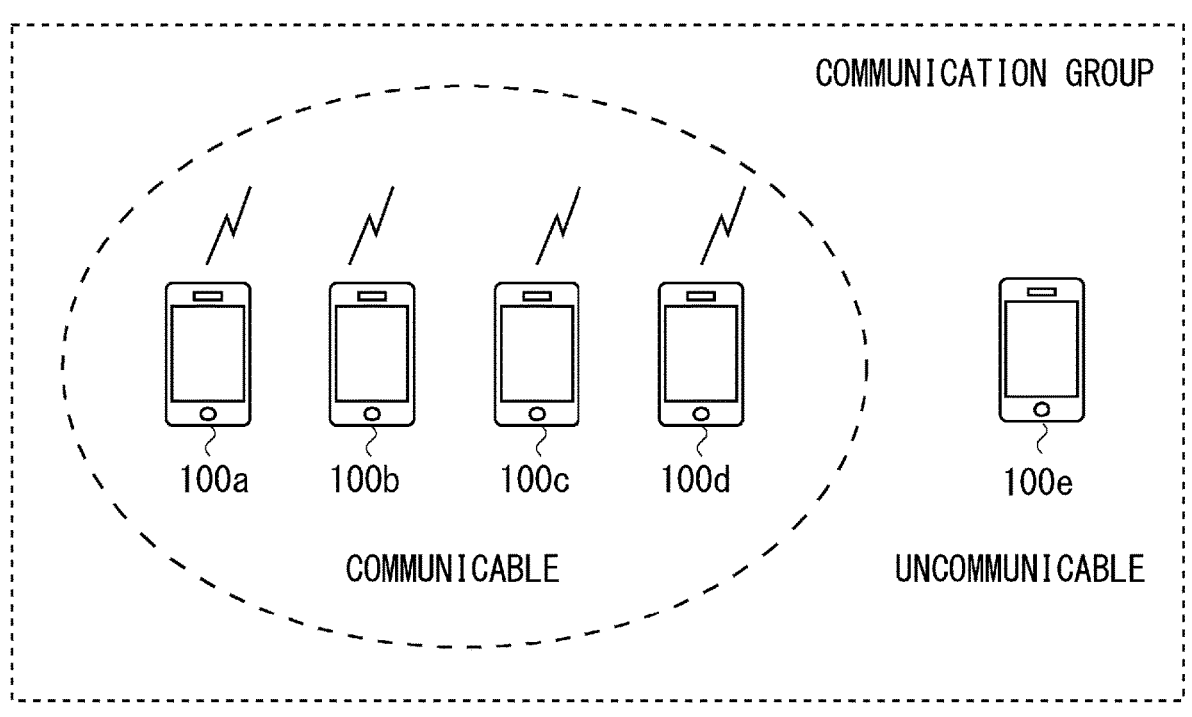

Example embodiments of the present disclosure are described below with reference to the drawings. FIG. 1 is a block diagram illustrating a configuration of a communication system 1 according to the present example embodiment. The communication system 1 includes a communication terminal 10 and a server 20 that controls group communication among a plurality of communication terminals 10.

The communication terminal 10 includes an acquisition unit 11, a selection unit 12, and a transmission unit 13. The acquisition unit 11 acquires information regarding group communication that has already been started among the plurality of communication terminals 10 and is in a non-answered state due to no answer at the start. The selection unit 12 selects any one from one or more group communications that are candidates for participation based on the information acquired by the acquisition unit 11. The transmission unit 13 transmits a participation request for the selected group communication to the server 20. The server 20 includes a participation acceptance unit 21. The participation acceptance unit 21 accepts participation of the communication terminal 10 in the selected group communication.

In the communication system 1 according to the present example embodiment, the acquisition unit 11 of the communication terminal 10 acquires information regarding group communication that has already been started and is in a non-answered state because the communication terminal 10 did not answer at the start. The selection unit 12 of the communication terminal 10 selects any one from one or more group communications that are candidates for participation of the communication terminal 10 based on the acquired information. The transmission unit 13 of the communication terminal 10 transmits a participation request for the selected group communication to the server 20. In response to the participation request, the participation acceptance unit 21 of the server 20 accepts participation of the communication terminal 10 in the selected group communication. As described above, in the communication system 1 according to the present example embodiment, the communication terminal 10 selects any one from one or more group communications that are candidates for participation based on information regarding group communication that is in a non-answered state. Therefore, with the communication system 1 according to the present example embodiment, it is possible to easily select group communication to participate in halfway.

Second Example Embodiment

Next, a configuration of a communication system 1000 according to a second example embodiment will be described with reference to FIG. 2. The second example embodiment is a specific example of the first example embodiment described above. FIG. 2 is a diagram illustrating the configuration of the communication system 1000 according to the present example embodiment.

The communication system 1000 includes a plurality of communication terminals 100a to 100e, a server 200, and a base station 300. The number of base stations 300 included in the communication system 1000 is not limited to one. Furthermore, the number of communication terminals 100 included in the communication system 1000 is not limited to five. The communication terminals 100a to 100e and the base station 300 are connected to the server 200 via a network N. Here, the network N is a wired or wireless communication line. The network N may be, for example, the Internet, a long term evolution (LTE) network, or a fifth generation (5G) network.

The communication terminals 100a to 100e are communication terminals capable of using a group communication function provided from the server 200. The communication terminals 100a to 100e can perform group communication provided from the server 200 via a predetermined application, for example, by installing the application. The communication terminals 100a to 100e may be, for example, communication terminals such as mobile phones, smartphones, tablet terminals, PHSs, or fixed-line phones. Hereinafter, the communication terminals 100a to 100e may be simply referred to as the communication terminals 100. Furthermore, the above-described base station 300 is not essential in a case where the communication terminal 100 is a fixed-line phone, and it is sufficient if the communication terminal 100 is connected to the network N via an exchanger, a repeater, or the like.

Here, it is assumed that the communication terminals 100a to 100e belong to the same group in the group communication function provided from the server 200. The communication terminals 100a to 100e are not limited to group communication, and can individually perform communication. Furthermore, the communication terminals 100a to 100e may further belong to different groups.

The server 200 provides a function of group communication among the plurality of communication terminals 100 and controls the group communication among the communication terminals 100. The group communication provided by the server 200 may include, for example, a group call, a web conference, or a chat function between the communication terminals 100a to 100e. In the group communications, communication data transmitted and received between the communication terminals 100 may include audio data, image data, video data, text data, and the like.

In the present example embodiment, a case where the server 200 controls a group call of the communication terminals 100a to 100e will be described as an example. The server 200 is implemented by, for example, a session initiation protocol (SIP) server, and executes SIP sequence processing at the time of communication among the communication terminals 100. The present disclosure is not limited thereto, and a communication protocol other than an SIP may be used for communication between the communication terminals 100.

When a group call start request is received from any one of the communication terminals 100 belonging to a group, the server 200 calls the communication terminals 100 belonging to the group. The server 200 newly issues a session ID for identifying the group call for which the start request is received, and manages the group call. Hereinafter, the start to end of the group call may be referred to as a session.

Here, it is assumed that, among the communication terminals 100a to 100e, the communication terminal 100a transmits a group call start request to the server 200, the communication terminals 100b to 100d respond to the start request, and the communication terminal 100e does not respond to the start request.

The server 200 starts the group call among the communication terminals 100a to 100d. The server 200 transmits an incoming call notification indicating that there is a participation request for the group call to the communication terminal 100e that has not answered the call. When the communication terminal 100e that has become to be able to answer the call transmits a participation request to the server 200, the server 200 receives the participation request and performs control to cause the communication terminal 100e to participate in the already started group call halfway.

For example, in a case where the communication terminal 100e cannot answer because of being outside the communication range, when entering the communication range, the communication terminal 100e notifies the server 200 that the communication terminal 100e has returned to the range, and receives an incoming call notification. The communication terminal 100e determines participation in a group call based on a content of the incoming call notification, and transmits a halfway-participation request for the group call to the server 200.

In addition, in a case where the communication terminal 100e is present within the communication range but is not able to answer due to another communication being performed, the communication terminal 100e receives an incoming call notification from the server 200 while performing the another communication, and stores the incoming call notification in a storage unit 190 to be described later. The another communication may be, for example, a call with another communication terminal, a web conference, chatting, or the like. Furthermore, a case where the communication terminal 100e activates an application that restricts calling from the server 200 and communication with other communication terminals may be included. When the another communication ends or restriction of another communication is released, the communication terminal 100e determines to participate in the group call based on the content of the incoming call notification, and transmits a halfway-participation request for the group to the server 200.

In addition, in a case where a power supply is not turned on at the start of the group communication or in a case where the user does not notice an incoming call because the communication terminal 100e is in a silent mode, the communication terminal 100e executes processing similar to the processing in a case where the user cannot answer because another communication is being performed.

Figure 3:
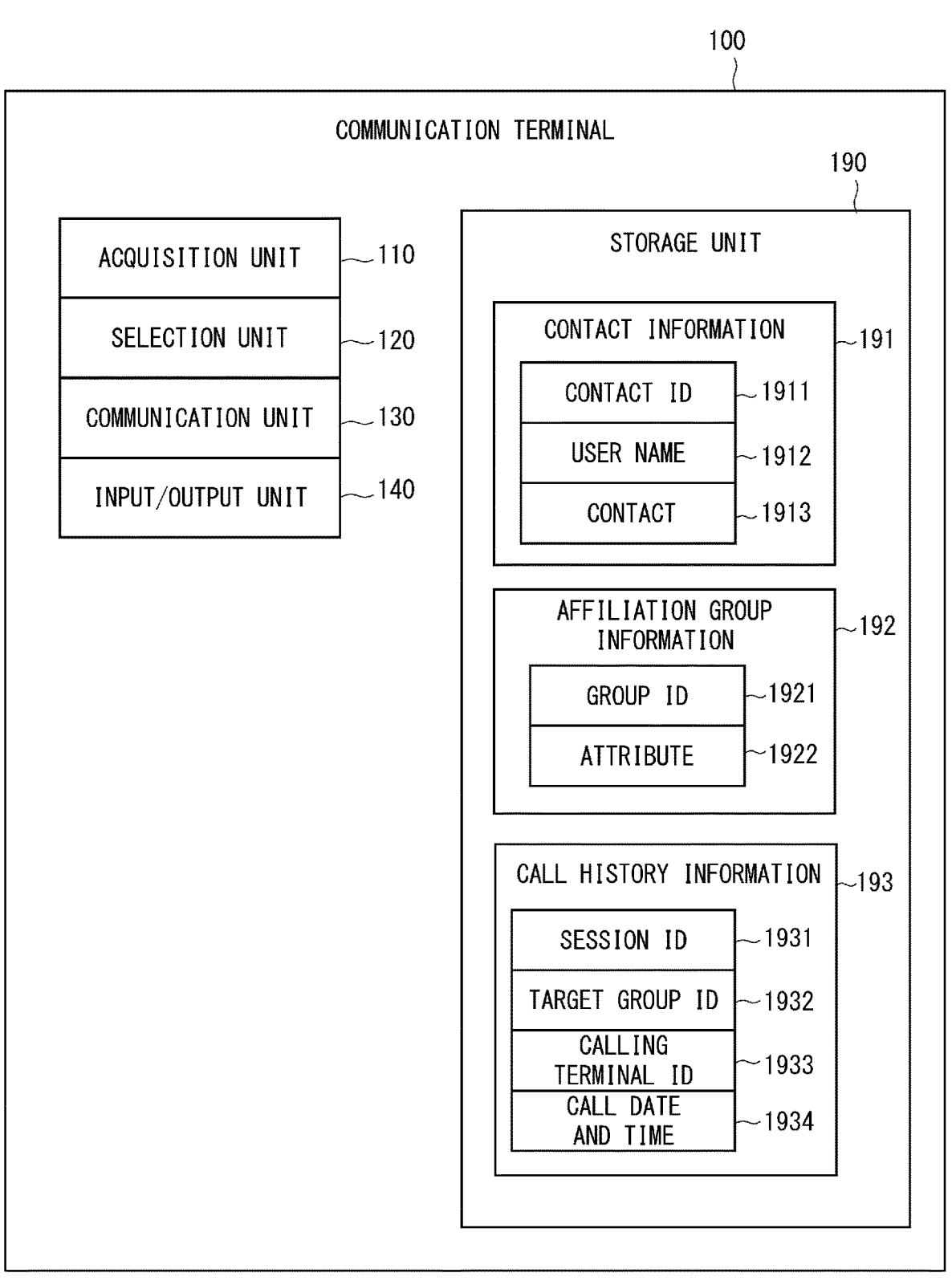
FIG. 3 is a block diagram illustrating a configuration of a communication terminal according to the second example embodiment.

Next, a configuration of the communication terminal 100 will be described. FIG. 3 is a block diagram illustrating the configuration of the communication terminal 100. The communication terminal 100 corresponds to the communication terminal 10 of the first example embodiment. Each of the communication terminals 100a to 100e has the configuration of the communication terminal 100 illustrated in FIG. 3. The communication terminal 100 includes an acquisition unit 110, a selection unit 120, a communication unit 130, an input/output unit 140, and the storage unit 190.

The acquisition unit 110 corresponds to the acquisition unit 11 of the first example embodiment. The acquisition unit 110 acquires information regarding group communication that has already been started among the plurality of communication terminals 100 and is in a non-answered state due to no answer at the start.

The information regarding the group communication may be information for specifying non-answered group communication for which the communication terminal 100 is called. The acquisition unit 110 receives information regarding non-answered group communication from the server 200, and stores the information in the storage unit 190 as call history information 193 in association with a session ID 1931 for identifying the group communication. The session ID 1931 corresponds to a session ID 2931 to be described later.

As illustrated in FIG. 3, for example, in the call history information 193, the session ID 1931, a target group ID 1932, a calling terminal ID 1933, and a call date and time 1934 may be associated with one another. The target group ID 1932 is identification information for identifying a target group for a session. The target group ID 1932 corresponds to a target group ID 2932 to be described later. The calling terminal ID 1933 is identification information for identifying a calling terminal. The calling terminal ID 1933 corresponds to a calling terminal ID 2933 to be described later. The call date and time 1934 is information indicating a date and time when the call is made for the communication terminal 100. The present disclosure is not limited thereto, and the call history information 193 may include various pieces of information regarding the group communication that is in a non-answered state because the communication terminal 100 did not answer at the start.

Here, for a group call that has already been started among the communication terminals 100a to 100d, the acquisition unit 110 of the communication terminal 100e that is in a non-answering state due to no answer at the start acquires the above-described information from the server 200. The acquisition unit 110 may acquire these pieces of information not from the server 200 but from any of the other communication terminals 100a to 100d in the group.

In addition, the acquisition unit 110 may acquire a plurality of pieces of information regarding non-answered group communication. For example, in a case where a plurality of group calls are made while the communication terminal 100e is outside the communication region, the acquisition unit 110 acquires information regarding the group calls. The acquisition unit 110 identifies the plurality of group calls by the session IDs 1931, and stores the information regarding the group calls as the call history information 193.

The selection unit 120 corresponds to the selection unit 12 of the first example embodiment. The selection unit 120 selects any group communication to participate in from one or more group communications that are candidates for participation based on the call history information 193 acquired by the acquisition unit 110. The selection unit 120 may cause the input/output unit 140 to display information regarding the selected group communication to make a notification to the user. In this way, the user can grasp group communication requesting halfway-participation.

Further, in a case where a plurality of pieces of call history information 193 are acquired by the acquisition unit 110, the selection unit 120 selects any group communication to participate in from one or more group communications that are candidates for participation based on the plurality of pieces of acquired call history information 193.

For example, the selection unit 120 selects any one from one or more group communications that are candidates for participation based on start date and time information of the group communications included in the plurality of pieces of acquired call history information 193. Here, the start date and time information of group communication may be included in the call history information 193 acquired by the acquisition unit 110. Alternatively, the call date and time 1934 when a call for group communication is made may be regarded as a start date and time of the group communication. For example, the selection unit 120 may select group communication whose start date and time is the latest, or may select group communication whose start date and time is the earliest. Furthermore, the selection unit 120 may select group communication whose duration is less than a predetermined time (for example, two hours) from the start date and time of the group communication. Furthermore, the selection unit 120 may acquire an end date and time of group communication from the server 200 and perform selection after excluding group communication that has ended.

Furthermore, the selection unit 120 may determine group communication to participate in based on a priority of the group communication. The priority of the group communication may be set by the communication terminal 100e, or may be set by another communication terminal 100. In a case where the priority is set by the communication terminal 100e, the selection unit 120 may set the priority with reference to, for example, affiliation group information 192 stored in the storage unit 190. For example, in a case where there are calls from a group whose attribute 1922 is "business" and a group whose attribute 1922 is "hobby", the selection unit 120 may set a higher priority to the group of "business" than the group of "hobby". The present disclosure is not limited thereto, and the selection unit 120 may set the priority according to the caller, the number of terminals participating in the group communication, the number of calls, or the like.

In a case where the priority is set by another communication terminal 100, for example, the priority, importance, urgency, or the like of each group communication may be set at the start of the group call and transmitted to the server 200. The acquisition unit 110 may acquire the call history information 193 including these pieces of information, and the selection unit 120 may determine group communication to participate in based on these pieces of information.

In this manner, the selection unit 120 can select group communication to participate in according to the start date and time information of the group communication, the priority of the group communication, and the like without waiting for a user's operation. Therefore, for example, by setting in advance in such a way that group communication whose start date and time is the latest is selected, the latest incoming group communication can be automatically selected and a call can be made.

The communication unit 130 communicates with another communication terminal 100 and the server 200. The communication unit 130 receives a missed call notification including information regarding non-answered state group communications from the server 200. When the communication terminal 100 moves out of the communication range and returns to the communication range, the communication unit 130 transmits, to the server 200, the fact that the communication terminal 100 has returned to the communication range. Then, the communication unit 130 receives a missed call notification transmitted from the server 200. In addition, in a case where the communication terminal 100 is present within the communication range, but is in a non-answered state due to another communication being performed, the communication unit 130 receives a missed call notification from the server 200 while performing the another communication.

Furthermore, the communication unit 130 corresponds to the transmission unit 13 of the first example embodiment. The communication unit 130 transmits a participation request for group communication selected by the selection unit 120 to the server 200. For example, it is assumed that only one piece of call history information 193 is acquired by the acquisition unit 110, and the selection unit 120 selects group communication corresponding to the information. The communication unit 130 automatically transmits a participation request for the group communication to the server 200. Alternatively, in a case where the user makes an input indicating participation in the group communication through the input/output unit 140, the communication unit 130 transmits a participation request for the group communication to the server 200.

Further, it is assumed that a plurality of pieces of call history information 193 are acquired by the acquisition unit 110. The communication unit 130 transmits, to the server 200, a participation request for any group communication selected from a plurality of group communication by the selection unit 120. Furthermore, the communication unit 130 may transmit, to the server 200, a participation request for group communication selected by the user through the input/output unit 140 (selection receiving unit). In this way, the user can confirm a plurality of group communications that are candidates for participation, select a desired group communication from the plurality of group communications, and make a halfway-participation request.

In a case where the communication terminal 100 has entered the communication range from outside the communication range or in a case where the communication terminal 100 that was performing another communication has ended the another communication, the communication unit 130 transmits a participation request for the selected group communication to the server 200.

In a case where the communication terminal 100 makes a start request for group communication as a calling terminal, the communication unit 130 transmits the start request including the group ID 1921 to the server 200.

The input/output unit 140 has functions of a display unit for displaying information regarding group communication and a selection receiving unit for receiving selection of group communication to participate in from the user. The input/output unit 140 may be, for example, a touch panel capable of receiving a user's touch operation.

The input/output unit 140 (display unit) displays information regarding a calling side in a case where information is acquired from another communication terminal 100 or the server 200 or when an incoming call is received. For example, when there is an incoming call from the communication terminal 100a to the communication terminal 100e, the input/output unit 140 of the communication terminal 100e displays that there is an incoming call from the communication terminal 100a by an application being activated in the communication terminal 100e, a pop-up, a notification, or the like. Here, a speaker (not illustrated), a vibrator (not illustrated), or the like included in the communication terminal 100e may be operated together. The input/output unit 140 may display the name, the phone number, and the like of the calling side with reference to contact information 191.

Further, the input/output unit 140 displays the call history information 193 corresponding to one or more group communications that are candidates for participation. In a case where there are a plurality of group communications that are candidates, the input/output unit 140 displays a plurality of pieces of call history information 193 in a predetermined order. The predetermined order may be, for example, an order based on the start date and time (call date and time), the end date and time, the number of calls, the priority, the importance, the urgency, or the like of a group call as described above. In this way, the user can easily select group communication to participate in.

Figure 4:
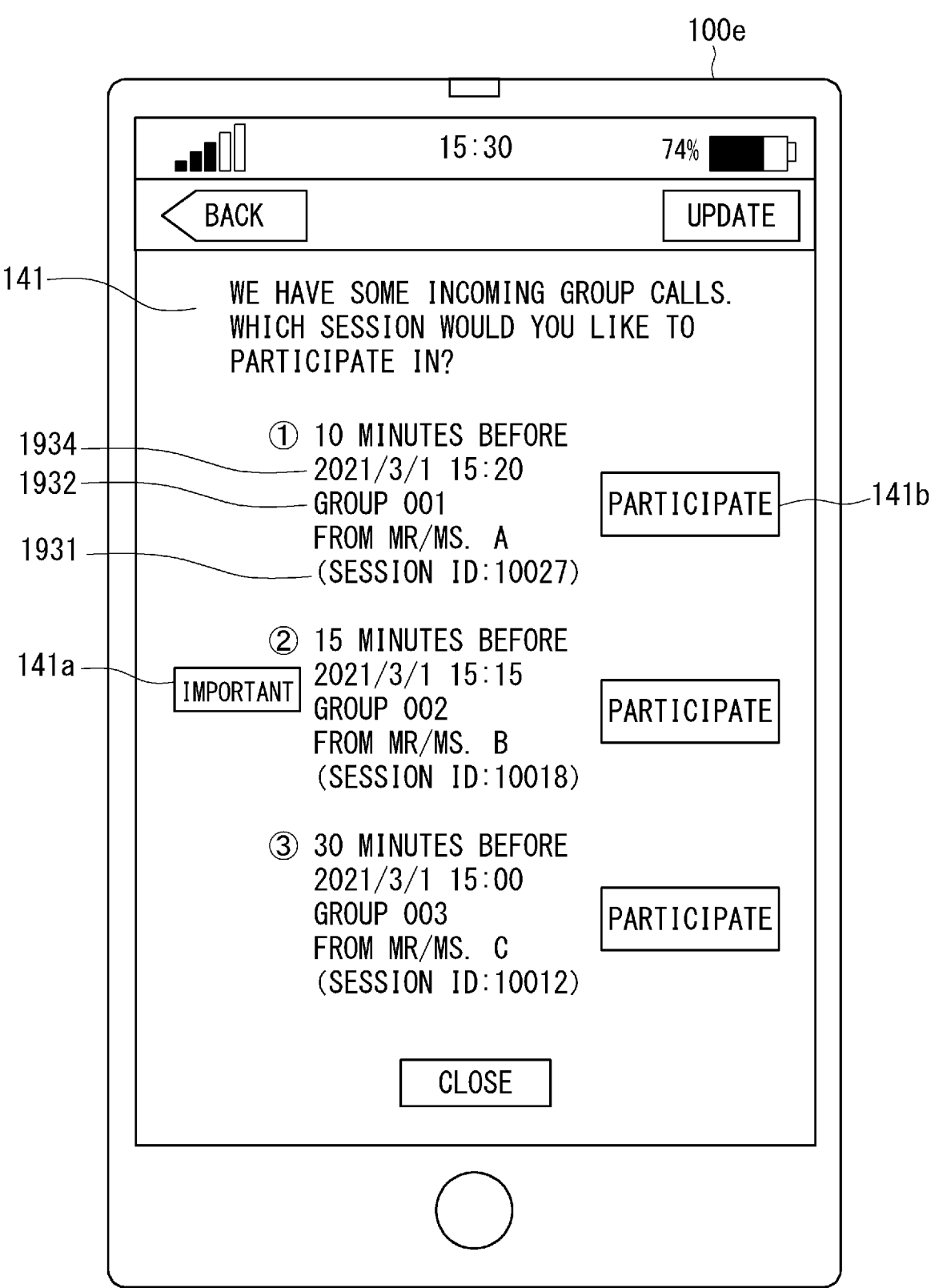
FIG. 4 is a view illustrating a display screen of the communication terminal according to the second example embodiment.

FIG. 4 is a view illustrating an example of a display screen 141 displayed on the input/output unit 140. Here, the input/output unit 140 displays pieces of call history information 193 in the order of the newest call date and time 1934 (see FIG. 3). As illustrated in FIG. 4, the input/output unit 140 may display the session ID 1931, the target group ID 1932, a caller name, the call date and time 1934, and the like on the display screen 141. In addition, the input/output unit 140 may display a display region 141a (for example, an "important" icon) indicating a priority or the like.

Only some of the pieces of call history information 193 corresponding to all the group communications for which the participation request has been made may be displayed on the input/output unit 140. For example, in a case where there are five incoming calls, three pieces of call history information 193 may be displayed according to the priority or the like. In this case, the remaining pieces of call history information 193 may be displayed according to a user's touch operation. The touch operation may include various operations such as tapping, swiping, dragging, or flicking.

The input/output unit 140 (selection receiving unit) receives, from the user, selection of group communication to participate in from a plurality of group communications corresponding to the plurality of pieces of displayed call history information 193. The input/output unit 140 may display an operation display region 141b for receiving selection from the user. The user can perform an operation on the communication terminal 100 by touching the operation display region 141b. In the example illustrated in FIG. 4, a "participate" button corresponding to each of the plurality of group communications is displayed as the operation display region 141b. The user can make a participation request for group communication by touching the "participate" button corresponding to the group communication to participate in.

Returning to FIG. 3, the description will be continued. The storage unit 190 is an example of a storage device such as a hard disk or a flash memory. The storage unit 190 stores the contact information 191, the affiliation group information 192, and the call history information 193.

The contact information 191 is information for managing a contact of a user. The contact information 191 may be, for example, information in which a contact ID 1911, a user name 1912, and a contact 1913 are associated with one another. The contact ID 1911 is information for identifying a contact. The user name 1912 is a name of a user corresponding to a contact. The contact 1913 may be a telephone number of a user, or the like. By registering these pieces of information in the storage unit 190 in advance, the user of the communication terminal 100 can confirm the phone number or the user name of the calling terminal by using the input/output unit 140 when there is an incoming call. The present disclosure is not limited thereto, and the contact information 191 may include an image of a user and the like.

The affiliation group information 192 is information for managing an affiliation group to which the communication terminal 100 belongs. The affiliation group information 192 may be, for example, information in which the group ID 1921 and the attribute 1922 are associated with each other. The group ID 1921 is information for identifying a group. The group ID 1921 corresponds to a group ID 2921 to be described later. The attribute 1922 is information indicating an attribute of a group. The attribute 1922 may be information indicating a classification according to a relationship with a member of a group, such as "work", "family", or "hobby". Furthermore, the attribute 1922 may be set in more detail according to an importance level, such as "business (normal)" or "business (important project)". The attribute 1922 may be arbitrarily set according to a user's operation.

The call history information 193 is information for managing a call history for the communication terminal 100. The call history information 193 may be, for example, information in which the session ID 1931, the target group ID 1932, the calling terminal ID 1933, and the call date and time 1934 are associated with one another. The call history information 193 may be acquired from session information included in an incoming call notification received from the server 200.

The session ID 1931 is information for identifying a session of group communication. The session ID 1931 is newly issued by the server 200 when the group communication is started. The target group ID 1932 is a group ID of a target group to participate in the session. A plurality of group IDs may be associated with one session.

The calling terminal ID 1933 is information for identifying a calling terminal. For example, the calling terminal may be the communication terminal 100a that has made a session start request. The present disclosure is not limited thereto, and, for example, in a case where there is a call from a terminal other than the communication terminal 100a halfway of group communication, the calling terminal ID 1933 may be information for identifying the calling terminal. The call date and time 1934 is information indicating a date and time when the communication terminal 100 is called for the session.

Figure 5:
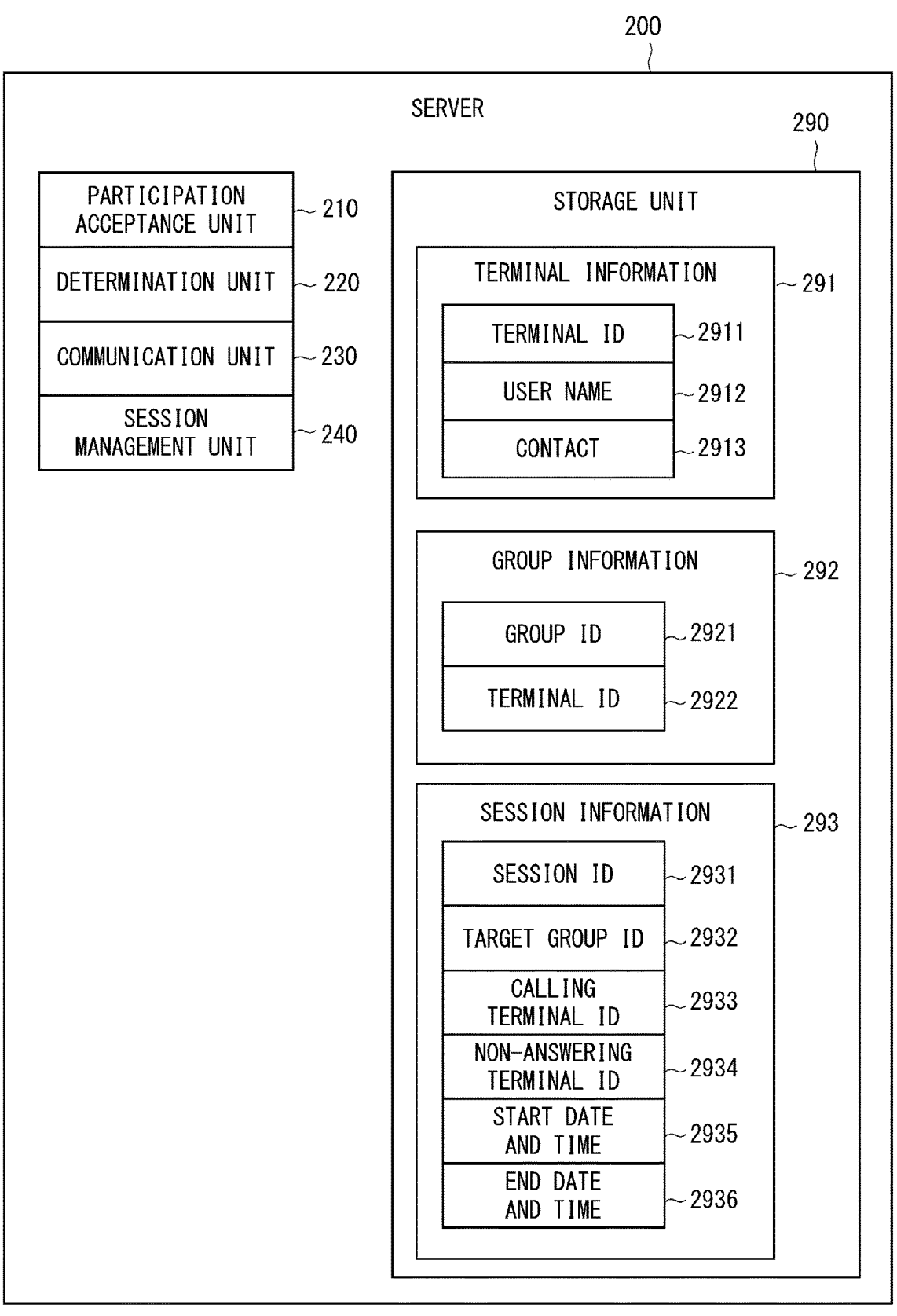
FIG. 5 is a block diagram illustrating a configuration of a server according to the second example embodiment.

Next, a configuration of the server 200 will be described. FIG. 5 is a block diagram illustrating the configuration of the server 200. The server 200 corresponds to the server 20 of the first example embodiment. The server 200 includes a participation acceptance unit 210, a determination unit 220, a communication unit 230, a session management unit 240, and a storage unit 290.

The participation acceptance unit 210 corresponds to the participation acceptance unit 21 of the first example embodiment. The participation acceptance unit 210 accepts participation of the communication terminal 100 in group communication selected through the input/output unit 140 of the communication terminal 100. In a case where the determination unit 220 determines that the group communication has already ended, the participation acceptance unit 210 may discard the participation request and suppress the start of new group communication based on the participation request. In this way, it is possible to execute processing of allowing the communication terminal 100 to participate only in ongoing group communication without executing halfway-participation processing for group communication that has already ended. Furthermore, it is possible to prevent the start of new group communication not intended by the user.

In a case where the communication unit 230 receives a halfway-participation request for group communication from the communication terminal 100, the determination unit 220 determines whether or not the group communication is being continued based on the session ID 2931 included in the halfway-participation request. The determination unit 220 checks whether or not an end date and time 2936 of the group communication is stored by referring to session information 293 corresponding to the session ID 2931. In a case where the end date and time 2936 is stored, the determination unit 220 determines that the group communication is not being continued, and in a case where the end date and time is not stored, the determination unit 220 determines that the group communication is being continued. The present disclosure is not limited thereto, and the determination unit 220 may make determination by referring to, for example, continuation state information indicating whether or not the group communication is being continued. For example, in a case where states such as "continuing" and "end" are stored in association with the session ID 2931, the determination unit 220 may make determination by referring to the states. The determination unit 220 outputs the determination result to the participation acceptance unit 210. In a case where the group communication is not being continued, the determination unit 220 may display information indicating the fact on the input/output unit 140.

The communication unit 230 communicates with the communication terminals 100a to 100e. For example, the communication unit 230 receives a group call start request from the communication terminal 100a that is a caller terminal, and calls the communication terminals 100b to 100e belonging to the group. Furthermore, the communication unit 230 receives a notification indicating that the communication terminal 100e has entered the communication range from the communication terminal 100e that was present outside the communication range, and transmits a missed call notification. Furthermore, the communication unit 230 receives a halfway-participation request from the communication terminal 100e.

The session management unit 240 manages a session of group communication. When the communication unit 230 receives a start request for group communication, the session management unit 240 newly issues the session ID 2931. The start request includes the group ID 1921 of a target group of the group communication. The session management unit 240 acquires the terminal ID 2922 of a terminal belonging to the target group by referring to group information 292. The session management unit 240 controls the communication unit 230 to make a call based on the contact 2913 of the terminal of the target group by referring to terminal information 291.

The session management unit 240 stores the session ID 2931 and information regarding the session in the storage unit 290 in association with each other. The session management unit 240 stores, for example, the session ID 2931, the target group ID 2932, and the calling terminal ID 2933 in the storage unit 290 as the session information 293 in association with each other. The target group ID 2932 is information for identifying a target group to participate in the session, and is included in the start request for the group communication. The calling terminal ID 2933 is information for identifying a calling terminal that has made a session start request. Here, the calling terminal ID 2933 may be information for identifying the communication terminal 100a.

In addition, in a case where there is a communication terminal 100 that does not answer a call, the session management unit 240 stores information indicating the fact in the session information 293 in association with the session ID 2931. For example, the session management unit 240 stores a non-answering terminal ID 2934 for identifying a terminal of the communication terminal 100e that does not answer a call in association with the session ID 2931. In this way, the session management unit 240 can manage information regarding the communication terminal 100 that is in a non-answering state due to no answer at the start of the session.

The session management unit 240 associates the start date and time and the end date and time of the session with the session ID 2931, and stores the start date and time 2935 and the end date and time 2936 in the session information 293. The session management unit 240 may acquire the start date and time and the end date and time of the session from the communication terminal 100. In addition, the session management unit 240 may receive information indicating the start and end of the group communication from the communication terminal 100 and store the continuation state information of the group communication. Examples of the continuation state may include "start", "continuing", "end", and the like.

The storage unit 290 is an example of a storage device such as a hard disk or a flash memory. The storage unit 290 stores the terminal information 291, the group information 292, and the session information 293. The terminal information 291 is information for managing a plurality of communication terminals 100. The terminal information 291 may be, for example, information in which a terminal ID 2911, a user name 2912, and a contact 2913 are associated with one another. The terminal ID 2911 is information for identifying a terminal. The user name 2912 is, for example, a name of a user who uses a terminal. The present disclosure is not limited thereto, and the user name 2912 may be information for identifying a user (for example, a user ID). The contact 2913 may be a telephone number of each terminal, or the like.

The group information 292 is information for managing a group. The group information 292 may be, for example, information in which the group ID 2921 and the terminal ID 2922 are associated with each other. The group ID 2921 is information for identifying a group. The terminal ID 2922 is information for identifying a terminal belonging to a group. The terminal ID 2922 corresponds to the terminal ID 2911. Since a plurality of terminals can belong to a group, a plurality of terminal IDs 2922 may be associated with one group ID 2921. The present disclosure is not limited thereto, and the group information 292 may include attributes and the like, similarly to the affiliation group information 192 in the communication terminal 100.

The session information 293 is information for managing a session. The session information 293 may be, for example, information in which the session ID 2931, the target group ID 2932, the calling terminal ID 2933, the non-answering terminal ID 2934, the start date and time 2935, and the end date and time 2936 are associated with one another.

The session ID 2931 is information for identifying a session of group communication. The target group ID 2932 is information for identifying a target group to participate in a session. A plurality of target group IDs 2932 may be associated with one session ID 2931. The calling terminal ID 2933 is information for identifying a terminal that has made a session start request. The non-answering terminal ID 2934 is information for identifying a terminal that has not responded to a session start request. The start date and time 2935 is information indicating a start date and time of a session. The end date and time 2936 is information indicating an end date and time of a session.

Next, processing executed by the communication system 1000 will be described with reference to sequence diagrams illustrated in FIGS. 6 and 7. Similarly to the above description, here, it is assumed that the communication terminal 100a in the group of the communication terminals 100a to 100e makes a start request for group communication, the communication terminals 100b to 100d respond, and the communication terminal 100e is in a non-answering state at the start of the group communication.

Figure 6:
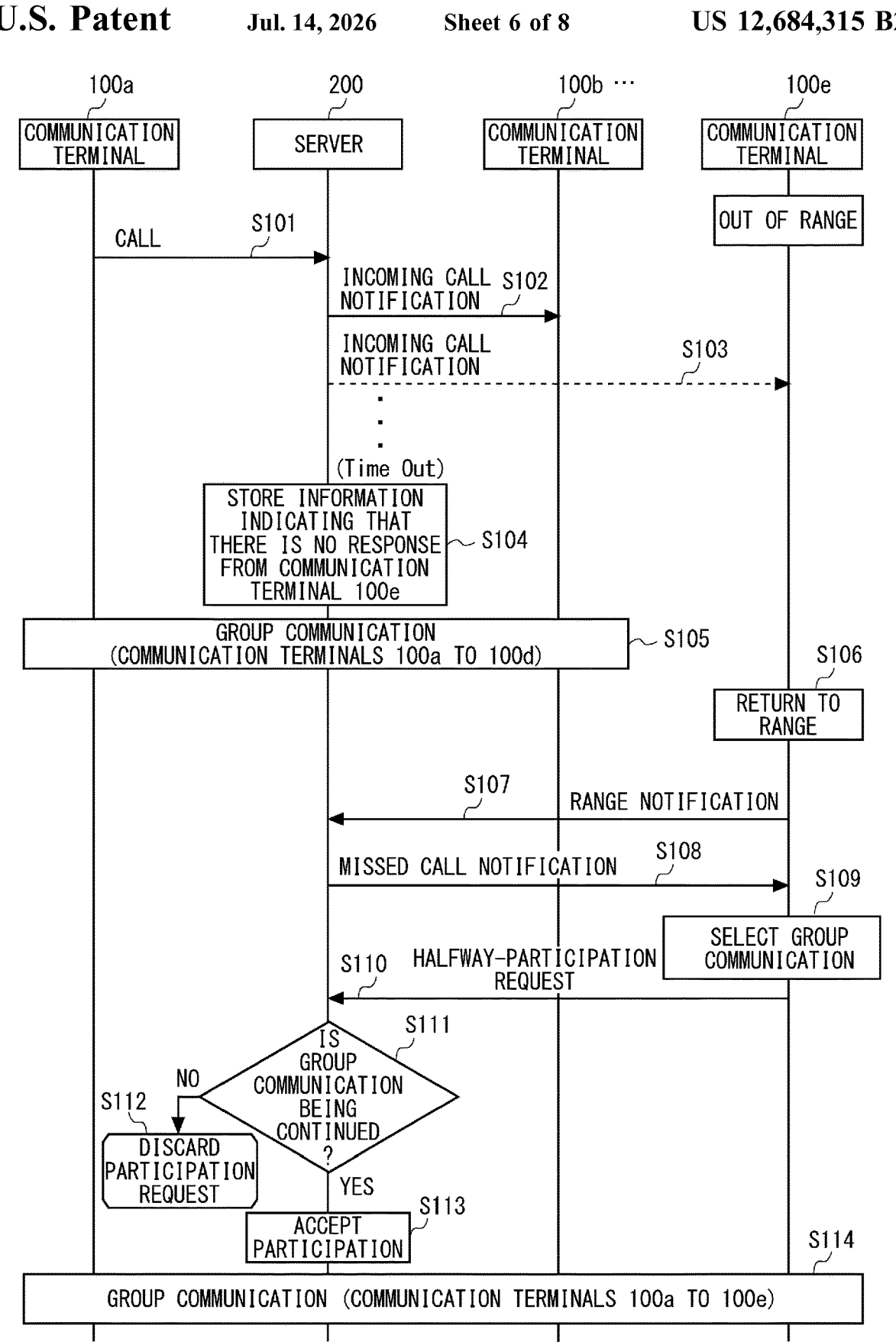
FIG. 6 is a sequence diagram illustrating processing in a case where the communication terminal returns from the outside of a range to the inside of the range according to the second example embodiment.

FIG. 6 illustrates processing in a case where the communication terminal 100e is in a non-answering state because of being outside the communication range, and then enters the communication range to be able to participate in the group communication halfway. FIG. 7 illustrates processing in a case where the communication terminal 100e is in a non-answering state due to another communication being performed, and then becomes able to participate in group communication halfway due to the end of the another communication. In FIGS. 6 and 7, a description of the communication terminals 100c and 100d that operate similarly to the communication terminal 100b is omitted.

First, processing in the communication system 1000 in a case where the communication terminal 100e moves from outside the communication range to the communication range will be described with reference to the sequence diagram illustrated in FIG. 6. First, the communication unit 130 of the communication terminal 100a transmits a start request for group communication to the server 200 (see FIG. 3) (S101). The transmitted start request includes a group ID for identifying a group. The session management unit 240 of the server 200 newly issues a session ID (see FIG. 5), and stores the session ID in the storage unit 290 as the session information 293 in association with the group ID. The communication unit 230 of the server 200 calls the communication terminals 100b to 100e belonging to the group. The server 200 makes an incoming call notification to the communication terminals 100b to 100d that have answered, and the communication terminals 100b to 100d receive the incoming call notification (S102).

Here, the communication terminal 100e does not answer the call from the server 200 because of being outside the communication range. Therefore, communication from the server 200 times out without receiving, by the communication terminal 100e, the incoming call notification from the server 200 (S103). In the session management unit 240, the server 200 stores information indicating that there is no response from the communication terminal 100e in association with the session ID (S104). The group communication is performed among the communication terminals 100a to 100d (S105).

The communication terminal 100e moves from the outside of the communication range and returns to the communication range (S106). The communication unit 130 of the communication terminal 100e transmits, to the server 200, information indicating that the communication terminal 100e has returned to the communication range (S107). The communication unit 230 of the server 200 transmits, to the communication terminal 100e, a missed call notification indicating that there is a participation request for the group communication for the communication terminal 100e (S108). The missed call notification may include session information including the session ID, the target group ID, the calling terminal ID, the call date and time, the start date and time of the group communication, or the like. The missed call notification may be transmitted by the communication terminals 100a to 100d.

The selection unit 120 of the communication terminal 100e selects group communication to participate in (S109). The selection unit 120 selects any one from one or more group communications that are candidates for participation based on the session information included in the missed call notification. Here, the selection unit 120 selects group communication for which the start request has been made by the communication terminal 100a as the group communication to participate. In a case where there is a call from a plurality of group communications, the selection unit 120 selects the group communication based on the start date and time and the priority of the group communication. The present disclosure is not limited thereto, and the input/output unit 140 may display the display screen as described with reference to FIG. 4 and receive selection of the group communication to participate in from the user. The input/output unit 140 may display information regarding the selected group communication and make a notification to the user.

The communication unit 130 transmits a halfway-participation request for the selected group communication to the server 200 (S110). The communication unit 130 may transmit the halfway-participation request in response to pressing of a predetermined button in the input/output unit 140 by the user, or may automatically transmit the halfway-participation request without depending on a user's operation. For example, in a case where the selection unit 120 is preset to select the latest incoming group communication, the communication unit 130 may automatically make a call to the latest incoming group communication regardless of a user's operation. The halfway-participation request includes the session ID of the group communication to participate in.

The server 200 receives the halfway-participation request from the communication terminal 100e, and the determination unit 220 determines whether or not the group communication is being continued (S111). The determination unit 220 acquires the session ID included in the halfway-participation request, and refers to the session information 293 of the group communication corresponding to the acquired session ID. In a case where the end date and time 2936 of the group communication is stored, the determination unit 220 determines that the group communication has ended, and in a case where the end date and time is not stored, the determination unit 220 determines that the group communication is being continued. The determination unit 220 may determine whether or not the group communication is being continued with reference to the continuation state information.

In a case where the determination unit 220 determines that the group communication has ended (NO in S111), the participation acceptance unit 210 of the server 200 discards the participation request and suppresses the start of new group communication based on the participation request (S112). The input/output unit 140 may display, for example, "group communication has already ended". Alternatively, the determination unit 220 may make the determination before step S108. In this case, the selection unit 120 may select the group communication to participate in from group communications that are being continued, and cause the input/output unit 140 to display the group communications. In this way, the user can grasp group communication to participate in, excluding group communication that has already ended.

In a case where the determination unit 220 determines that the group communication is being continued (YES in S111), the participation acceptance unit 210 of the server 200 accepts participation of the communication terminal 100e in the selected group communication (S113). The communication terminal 100e participates in the group communication halfway, and the group communication is performed among the communication terminals 100a to 100e (S114). The session management unit 240 stores, in the session information 293, information indicating that the communication terminal 100e participates in the group communication. The session management unit 240 may receive information indicating the start and end of the group communication from the communication terminal 100a or the like, and store the start date and time and the end date and time of the group communication in the session information 293. The session management unit 240 may store the end of the group communication in the session information 293 and update the continuation state information of the group communication.

Next, processing in a case where the communication terminal 100e that has been performing another communication can participate in the group communication halfway due to the end of the another communication will be described with reference to the sequence diagram illustrated in FIG. 7.

First, the communication unit 130 of the communication terminal 100a transmits a start request for group communication to the server 200 (see FIG. 3) (S201). The transmitted start request includes a group ID for identifying a group. The session management unit 240 of the server 200 newly issues a session ID (see FIG. 5), and stores the session ID in the storage unit 290 as the session information 293 in association with the group ID. The communication unit 230 of the server 200 calls the communication terminals 100b to 100e belonging to the group. The server 200 makes an incoming call notification to the communication terminals 100b to 100d that have answered, and the communication terminals 100b to 100d receive the incoming call notification (S202).

The communication unit 130 of the communication terminal 100e receives the incoming call notification from the server 200 (S203). However, the communication terminal 100e does not answer the call from the server 200 because another communication is being performed. The acquisition unit 110 of the communication terminal 100e acquires session information included in the incoming call notification, and stores the session information in the storage unit 190 as the call history information 193 (S204). The session information may include the session ID, the target group ID, the calling terminal ID, the call date and time, the start date and time of the group communication, or the like. The group communication is performed among the communication terminals 100a to 100d (S205).

The communication terminal 100e ends the another communication (S206). The selection unit 120 of the communication terminal 100e selects group communication to participate in (S207). Step S207 is similar to step S109 illustrated in FIG. 6, and thus a detailed description thereof will be omitted.

The communication unit 130 transmits a halfway-participation request for the selected group communication to the server 200 (S208). The communication unit 130 may transmit the halfway-participation request in response to pressing of a predetermined button in the input/output unit 140 by the user, or may automatically transmit the halfway-participation request without depending on a user's operation. Similarly to step S110 illustrated in FIG. 6, the communication unit 130 may automatically make a call to the latest incoming group communication, for example. The halfway-participation request includes the session ID of the group communication to participate in.

The server 200 receives the halfway-participation request from the communication terminal 100e, and the determination unit 220 determines whether or not the group communication is being continued (S209). Since the determination method is similar to step S111 illustrated in FIG. 6, a detailed description thereof will be omitted. In a case where the determination unit 220 determines that the group communication has ended (NO in S209), the participation acceptance unit 210 of the server 200 discards the participation request and suppresses the start of new group communication based on the participation request (S210). The determination unit 220 may monitor the continuation state of the group communication corresponding to the incoming call notification transmitted in step S203. When the group communication for which the incoming call notification has been transmitted has ended, the determination unit 220 may transmit information indicating the end to the communication terminal 100e and cause the input/output unit 140 to display the information. In this way, the user can grasp group communication to participate in, excluding group communication that has already ended.

In a case where the determination unit 220 determines that the group communication is being continued (YES in S209), the participation acceptance unit 210 of the server 200 accepts participation of the communication terminal 100e in the selected group communication (S211). The communication terminal 100e participates in the group communication halfway, and the group communication is performed among the communication terminals 100a to 100e (S212). The session management unit 240 stores, in the session information 293, information indicating that the communication terminal 100e participates in the group communication. The session management unit 240 may receive information indicating the start and end of the group communication from the communication terminal 100a or the like, and store the start date and time and the end date and time of the group communication in the session information 293. The session management unit 240 may store the end of the group communication in the session information 293 and update the continuation state information of the group communication.

As described above, in the communication system 1000 according to the present example embodiment, the communication terminal 100e that did not answer a call at the start of group communication acquires information regarding the group communication from the server 200. The selection unit 120 of the communication terminal 100e selects any one from one or more group communications that are candidates for participation halfway based on the acquired information. In a case where a plurality of pieces of information regarding group communications are acquired, the selection unit 120 selects any group communication according to the start date and time, the priority, and the like of the group communication based on the plurality of pieces of information. Furthermore, the input/output unit 140 of the communication terminal 100e displays a plurality of group communications in a predetermined order according to the call date and time, the priority of the group communication, and the like, and receives selection from the user. In this way, the user can easily select group communication to participate in.

The communication terminal 100e can make a halfway-participation request as described above in both a case where the communication terminal 100e is moved from the outside of the communication range to the communication range and a case where another communication was being performed and has ended, so that the communication terminal can more reliably participate in group communication halfway.

<Configuration Example of Hardware>

The functional components of the communication terminal 100 and the server 200 may be implemented by hardware (for example, a hard-wired electronic circuit) that implements the functional components, or by a combination of hardware and software (for example, a combination of an electronic circuit and a program that controls the electronic circuit). Hereinafter, a case where each functional component of the communication terminal 100 and the like is implemented by a combination of hardware and software will be further described.

Figure 8:
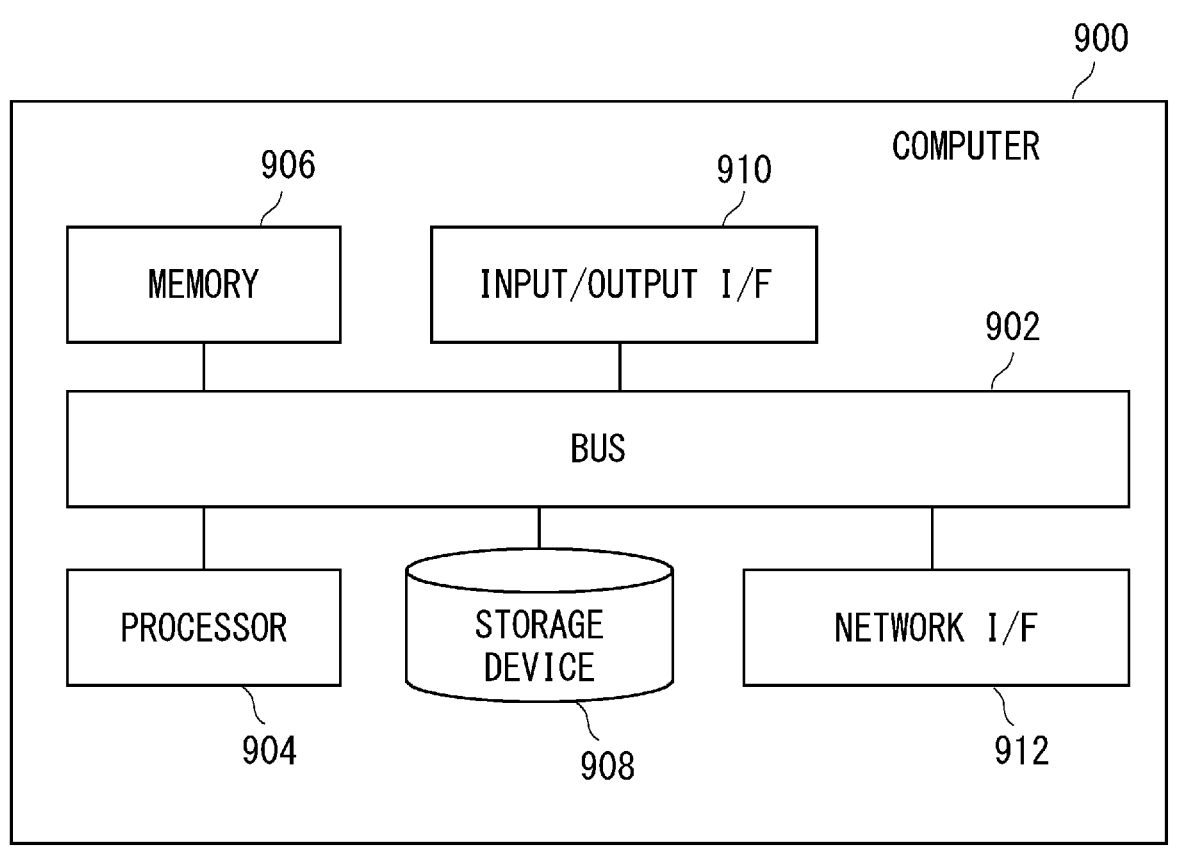
FIG. 8 is a diagram illustrating a hardware configuration example of the communication terminal or the like according to the second example embodiment.

FIG. 8 is a block diagram illustrating a hardware configuration of a computer 900 that implements the communication terminal 100 and the like. The computer 900 may be a dedicated computer designed to implement the communication terminal 100 and the like, or may be a general-purpose computer. The computer 900 may be a portable computer such as a smartphone or a tablet terminal.

For example, by installing a predetermined application in the computer 900, each function of the communication terminal 100 and the like is implemented in the computer

900. The application is configured by a program for implementing a functional component of the communication terminal 100 and the like.

The computer 900 includes a bus 902, a processor 904, a memory 906, a storage device 908, an input/output interface 910, and a network interface 912. The bus 902 is a data transmission path for the processor 904, the memory 906, the storage device 908, the input/output interface 910, and the network interface 912 to transmit and receive data to and from each other. However, a method of connecting the processor 904 and the like to each other is not limited to the bus connection.

The processor 904 is a variety of processors such as a central processing unit (CPU), a graphics processing unit (GPU), or a field-programmable gate array (FPGA). The memory 906 is a main storage device implemented by using a random access memory (RAM) or the like. The storage device 908 is an auxiliary storage device implemented by using a hard disk, a solid state drive (SSD), a memory card, a read only memory (ROM), or the like.

The input/output interface 910 is an interface for connecting the computer 900 and an input/output device. For example, an input device such as a keyboard and an output device such as a display device are connected to the input/output interface 910.

The network interface 912 is an interface for connecting the computer 900 to a network. The network may be a local area network (LAN) or a wide area network (WAN).

The storage device 908 stores a program (a program for implementing the above-described application) for implementing each functional component of the communication terminal 100 and the like. The processor 904 reads the program into the memory 906 and executes the program to implement the functional component of the communication terminal 100 and the like.

Each of the processors executes one or a plurality of programs including an instruction set for causing a computer to execute an algorithm. The program may be stored by using various types of non-transitory computer-readable media and provided to a computer. The non-transitory computer-readable media include various types of tangible storage media. Examples of non-transitory computer-readable media include magnetic storage media (for example, floppy disks, magnetic tapes, and hard disk drives), optical magnetic storage media (for example, magneto-optical disks, optical disk media such as compact disc (CD) and digital versatile discs (DVD), and semiconductor memories (for example, mask ROMs, programmable ROMs (PROMs), erasable PROMs (EPROMs), flash ROMs, and RAMs). In addition, programs may be provided to computers by various types of transitory computer-readable media. Examples of the transitory computer-readable media include electric signals, optical signals, and electromagnetic waves. The transitory computer-readable media may supply the program to the computer via a wired communication path such as electric wires and optical fibers, or a wireless communication path.

Note that the present disclosure is not limited to the above example embodiments, and can be appropriately changed without departing from the scope.

Some or all of the above-described example embodiments may be described as in the following Supplementary Notes, but are not limited to the following Supplementary Notes.

(Supplementary Note 1)

A communication system including:

a communication terminal; and a server that controls group communication among a plurality of the communication terminals, in which the communication terminal includes acquisition means for acquiring information regarding group communication that has already been started among the plurality of communication terminals and is in a non-answered state due to no answer at the start, selection means for selecting any one from one or more group communications that are candidates for participation based on the acquired information, and transmission means for transmitting a participation request for the selected group communication to the server, and the server includes participation acceptance means for accepting participation of the communication terminal in the selected group communication.

(Supplementary Note 2)

The communication system according to Supplementary Note 1, in which when the communication terminal has entered a communication range from outside the communication range or when the communication terminal that was performing another communication has ended the another communication, the transmission means transmits the participation request for the selected group communication to the server.

(Supplementary Note 3)

The communication system according to Supplementary Note 1 or 2, in which the acquisition means acquires a plurality of pieces of the information, and the selection means selects any one from one or more group communications that are the candidates for participation based on the plurality of pieces of acquired information.

(Supplementary Note 4)

The communication system according to Supplementary Note 3, in which the selection means selects any one from one or more group communications that are the candidates for participation based on start date and time information of the group communications included in the plurality of pieces of acquired information.

(Supplementary Note 5)

The communication system according to any one of Supplementary Notes 1 to 4, in which the communication terminal further includes display means for displaying the information corresponding to one or more group communications that are the candidates for participation, and selection receiving means for receiving, from a user, selection of the group communication to participate in from one or more group communications that are the candidates for participation, when there are a plurality of pieces of the information corresponding to one or more group communications that are the candidates for participation, the display means displays the plurality of pieces of information in a predetermined order, the selection receiving means receives, from the user, selection of the group communication to participate in based on the plurality of pieces of displayed information regarding one or more group communications that are the candidates for participation, and the transmission means transmits a participation request for the group communication selected by the selection receiving means to the server.

(Supplementary Note 6)

The communication system according to any one of Supplementary Notes 1 to 5, in which the server further includes determination means for determining whether or not the selected group communication is being continued, and when it is determined that the selected group communication has already ended, the participation acceptance means discards the participation request and suppresses start of new group communication based on the participation request.

(Supplementary Note 7)

A communication terminal including:

acquisition means for acquiring information regarding group communication that has already been started among a plurality of communication terminals and is in a non-answered state due to no answer at the start;

selection means for selecting any one from one or more group communications that are candidates for participation based on the acquired information; and transmission means for transmitting a participation request for the selected group communication to a server that controls the group communication among the plurality of communication terminals.

(Supplementary Note 8)

The communication terminal according to Supplementary Note 7, in which when the communication terminal has entered a communication range from outside the communication range or when the communication terminal that was performing another communication has ended the another communication, the transmission means transmits the participation request for the selected group communication to the server.

(Supplementary Note 9)

A communication method including:

acquiring information regarding group communication that has already been started among a plurality of communication terminals and is in a non-answered state due to no answer at the start;

selecting any one from one or more group communications that are candidates for participation based on the acquired information; and transmitting a participation request for the selected group communication to a server that controls the group communication among the plurality of communication terminals.

(Supplementary Note 10)

A non-transitory computer-readable medium storing a communication program that causes a computer to execute:

acquisition processing of acquiring information regarding group communication that has already been started among a plurality of communication terminals and is in a non-answered state due to no answer at the start;

selection processing of selecting any one from one or more group communications that are candidates for participation based on the acquired information; and transmission processing of transmitting a participation request for the selected group communication to a server that controls the group communication among the plurality of communication terminals.

REFERENCE SIGNS LIST

1 COMMUNICATION SYSTEM
10 COMMUNICATION TERMINAL
11 ACQUISITION UNIT
12 SELECTION UNIT
13 TRANSMISSION UNIT
20 SERVER
21 PARTICIPATION ACCEPTANCE UNIT 100 and 100*a* to 100*e* COMMUNICATION TERMINAL
110 ACQUISITION UNIT
120 SELECTION UNIT
130 COMMUNICATION UNIT
140 INPUT/OUTPUT UNIT
141 DISPLAY SCREEN
141*a* DISPLAY REGION
141*b* OPERATION DISPLAY REGION
190 STORAGE UNIT
191 CONTACT INFORMATION
1911 CONTACT ID
1912 USER NAME
1913 CONTACT
192 AFFILIATION GROUP INFORMATION
1921 GROUP ID
1922 ATTRIBUTE
193 CALL HISTORY INFORMATION
1931 SESSION ID
1932 TARGET GROUP ID
1933 CALLING TERMINAL ID
1934 CALL DATE AND TIME
200 SERVER
210 PARTICIPATION ACCEPTANCE UNIT
220 DETERMINATION UNIT
230 COMMUNICATION UNIT
240 SESSION MANAGEMENT UNIT
290 STORAGE UNIT
291 TERMINAL INFORMATION
2911 TERMINAL ID
2912 USER NAME
2913 CONTACT
292 GROUP INFORMATION
2921 GROUP ID
2922 TERMINAL ID
293 SESSION INFORMATION
2931 SESSION ID
2932 TARGET GROUP ID
2933 CALLING TERMINAL ID
2934 NON-ANSWERING TERMINAL ID
2935 START DATE AND TIME
2936 END DATE AND TIME
300 BASE STATION
900 COMPUTER
902 BUS
904 PROCESSOR
906 MEMORY
908 STORAGE DEVICE
910 INPUT/OUTPUT INTERFACE
912 NETWORK INTERFACE
1000 COMMUNICATION SYSTEM
N NETWORK

What is claimed is:

1. A communication system comprising:
a communication terminal; and
a server that controls group communication among a plurality of the communication terminals, wherein
the communication terminal includes:
at least one memory storing instructions; and
at least one processor configured to execute the instructions to:
acquire information regarding group communication that has already been started among the plurality of communication terminals and is in a non-answered state due to no answer at the start;
select any one from one or more group communications that are candidates for participation based on the acquired information; and when the communication terminal that was performing another communication has ended the another communication, transmit a participation request for the selected group communication to the server, and
the server includes:
at least one memory storing instructions; and
at least one processor configured to execute the instructions to accept participation of the communication terminal in the selected group communication.

2. The communication system according to claim 1, wherein the at least one processor of the communication terminal is further configured to execute the instructions to, when the communication terminal has entered a communication range from outside the communication range, transmit the participation request for the selected group communication to the server.

3. The communication system according to claim 1, wherein
the at least one processor of the communication terminal is further configured to execute the instructions to:
acquire a plurality of pieces of the information; and
select any one from one or more group communications that are the candidates for participation based on the plurality of pieces of acquired information.

4. The communication system according to claim 3, wherein
the at least one processor of the communication terminal is further configured to execute the instructions to select any one from one or more group communications that are the candidates for participation based on start date and time information of the group communications included in the plurality of pieces of acquired information.

5. The communication system according to claim 1, wherein
the at least one processor of the communication terminal is further configured to execute the instructions to:
display the information corresponding to one or more group communications that are the candidates for participation; and
receive, from a user, selection of the group communication to participate in from one or more group communications that are the candidates for participation,
the at least one processor of the communication terminal is further configured to execute the instructions to:
when there are a plurality of pieces of the information corresponding to one or more group communications that are the candidates for participation, display the plurality of pieces of information in a predetermined order;
receive, from the user, selection of the group communication to participate in based on the plurality of pieces of displayed information regarding one or more group communications that are the candidates for participation; and
transmit a participation request for the selected group communication to the server.

6. The communication system according to claim 1, wherein
the at least one processor of the server is further configured to execute the instructions to:
determine whether or not the selected group communication is being continued; and
when it is determined that the selected group communication has already ended, discard the participation request and suppress start of new group communication based on the participation request.

7. A communication terminal comprising:

at least one memory storing instructions; and at least one processor configured to execute the instructions to:

acquire information regarding group communication that has already been started among a plurality of communication terminals and is in a non-answered state due to no answer at the start;

select any one from one or more group communications that are candidates for participation based on the acquired information; and when the communication terminal that was performing another communication has ended the another communication, transmit a participation request for the selected group communication to a server that controls the group communication among the plurality of communication terminals.

8. The communication terminal according to claim 7, wherein the at least one processor is further configured to execute the instructions to, when the communication terminal has entered a communication range from outside the communication range, transmit the participation request for the selected group communication to the server.

9. A communication method comprising:

acquiring information regarding group communication that has already been started among a plurality of communication terminals and is in a non-answered state due to no answer at the start;

selecting any one from one or more group communications that are candidates for participation based on the acquired information; and when a communication terminal, from the plurality of communication terminals, that was performing another communication has ended the another communication, transmitting a participation request for the selected group communication to a server that controls the group communication among the plurality of communication terminals.

\* \* \* \* \*